US010697500B2

(12) United States Patent
Roses et al.

(10) Patent No.: US 10,697,500 B2
(45) Date of Patent: Jun. 30, 2020

(54) TWO PATH SEALED CLUTCH (71) Applicant: GM GLOBAL TECHNOLOGY OPERATIONS LLC, Detroit, MI (US)

(72) Inventors: Victor M Roses, Ann Arbor, MI (US); Edward J Billings, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 293 days.

(21) Appl. No.: 15/802,768

(22) Filed: Nov. 3, 2017

(65) Prior Publication Data

US 2019/0136914 A1    May 9, 2019

(51) Int. Cl.
*F16D 13/72* (2006.01)
*F16D 25/0635* (2006.01)
*F16D 25/12* (2006.01)
*F16H 45/02* (2006.01)
*F16D 13/64* (2006.01)
*F16H 63/30* (2006.01)

(52) U.S. Cl.
CPC .............. *F16D 13/72* (2013.01); *F16D 13/64* (2013.01); *F16D 25/0635* (2013.01); *F16D 25/12* (2013.01); *F16H 45/02* (2013.01); *F16H 63/30* (2013.01); *F16D 2300/08* (2013.01); *F16H 2045/0205* (2013.01); *F16H 2045/0215* (2013.01); *F16H 2045/0289* (2013.01); *F16H 2045/0294* (2013.01)

(58) Field of Classification Search
CPC ...... F16D 13/64; F16D 13/72; F16D 25/0635; F16D 25/12; F16D 25/123; F16D 2300/08; F16H 45/02; F16H 2045/0205; F16H 2045/0215; F16H 2045/0289; F16H 2045/0294

See application file for complete search history.

(56) References Cited

U.S. PATENT DOCUMENTS

| 4,051,932 | A | 10/1977 | Arai et al. |
| 4,199,047 | A | 4/1980 | Ling |
| 5,058,716 | A | 10/1991 | Lippe et al. |
| 5,407,041 | A | 4/1995 | Fukunaga et al. |
| 6,343,679 | B1 | 2/2002 | Kundermann |
| 6,837,348 | B2 | 1/2005 | Breier et al. |
| 6,915,886 | B2 | 7/2005 | Dacho et al. |
| 7,143,879 | B2 | 12/2006 | Ackermann et al. |
| 7,621,385 | B2 | 11/2009 | Samie et al. |
| 2007/0000747 | A1* | 1/2007 | Miyazaki .............. F16D 13/648 192/70.12 |

(Continued)

FOREIGN PATENT DOCUMENTS

| CN | 85101334 A | 1/1987 |
| JP | 2-62473 | 3/1990 |

*Primary Examiner* — Jacob S. Scott
*Assistant Examiner* — Lori Wu (57) ABSTRACT

A clutch assembly and a torque converter assembly having a clutch assembly, for an automotive transmission, are provided. The clutch assembly includes a clutch plate and a piston or pressure plate configured to selectively engage the clutch plate, the piston being movable between an applied position and a released position. An annular seal is disposed adjacent to the piston, wherein movement of the piston and hydraulic pressure causes the annular seal to move between a sealed position and an open position.

18 Claims, 4 Drawing Sheets

(56) References Cited

U.S. PATENT DOCUMENTS

| | | | |
|---|---|---|---|
| 2008/0308374 A1* | 12/2008 | Heukelbach | F16H 45/02 |
| | | | 192/3.25 |
| 2010/0025937 A1* | 2/2010 | Morishita | F16D 25/0638 |
| | | | 277/549 |
| 2016/0290509 A1* | 10/2016 | Billings | F16H 41/24 |
| 2018/0031099 A1* | 2/2018 | Verhoog | F16H 41/28 |

* cited by examiner

TWO PATH SEALED CLUTCH

FIELD

The present disclosure relates generally to a clutch assembly, which may be useful in an automatic transmission and/or a torque converter clutch assembly.

INTRODUCTION

A torque converter is a hydrodynamic unit that transfers torque between an engine and an automatic transmission. The torque converter generally includes a torque converter pump (driving member), a turbine (a driven member), and a stator that are disposed in a housing full of hydraulic fluid. The torque converter pump is generally disposed at a rear portion of the housing (away from the engine), and it turns with a crankshaft of an engine. The turbine is generally disposed at a front portion of the housing (near the engine), and is connected to a transmission input shaft. The turbine is free to rotate independently from the torque converter pump.

The hydraulic fluid flows from the torque converter pump toward the turbine in a radial outer portion of the torque converter. The hydraulic fluid then flows from the turbine back toward the torque converter pump by way of the stator in a radial inner portion of the torque converter. At low torque converter speed ratios, redirection of the hydraulic fluid by the stator causes torque multiplication, thereby improving vehicle performance. However, at higher torque converter speed ratios, the transfer of torque through the torque converter becomes inefficient and impairs fuel economy.

In order to optimize vehicle efficiency, the torque converter may be "locked" after a predefined torque converter speed ratio is reached such that the torque converter pump and turbine are mechanically coupled and rotate together. A "lock-up" torque converter clutch is therefore commonly provided to lock the torque converter and thereby optimize efficiency. The torque converter clutch may be an electronically controlled converter clutch (ECCC) configured to lock-up completely or to selectively slip in a controllable manner. Therefore, the torque converter clutch can absorb a portion of an engine torque spike by controlled slipping to provide smoother vehicle operation. In other words, the torque converter clutch may be programmed to slip by an amount necessary to prevent the engine torque spike from being transferred to the transmission.

However, when the torque converter clutch is slipping, sufficient cooling oil may not be flowing to the clutch because the same oil that is used to apply the clutch may also be used for cooling, but when the clutch is applied, oil is sealed away from the clutch plate or plates. This is the case with a two-path torque converter clutch (an oil apply path, and an oil release path).

To solve the issue of lack of sufficient cooling oil, a dedicated oil flow path can be created to cool the clutch. When a dedicated oil flow path is used, the torque converter clutch is referred to as a three-path torque converter clutch. However, the third oil flow path typically adds complexity, packaging space needs, and cost.

SUMMARY

The present disclosure provides a clutch assembly having a dedicated seal. The seal is annular and moves between a sealed position and an open position. Use of the dedicated seal allows the release cavity to be sealed quickly when the clutch is applied. The clutch plate or plates are not used as a seal, and therefore, flow paths can be formed through the friction lining of the clutch plate to provide better cooling of the clutch plates in a two-path torque converter clutch.

In one form, which may be combined with or separate from the other forms provided herein, a clutch assembly for an automotive transmission is provided. The clutch assembly includes a clutch plate and a piston configured to selectively engage the clutch plate. The piston is movable between an applied position and a released position. An annular seal is disposed adjacent to the piston, wherein movement of the piston and hydraulic pressure causes the annular seal to move between a sealed position and an open position.

In another form, which may be combined with or separate from the other forms disclosed herein, a torque converter assembly is provided for an automatic transmission. The torque converter assembly includes a torque converter housing and a torque converter clutch disposed within the torque converter housing, wherein the torque converter clutch includes a clutch plate. A pressure plate is configured to selectively engage the clutch plate, the pressure plate being movable between an applied position and a released position. An annular seal is disposed adjacent to the pressure plate and the torque converter housing. Movement of the pressure plate and hydraulic pressure causes the annular seal to move between a sealed position and an open position. The annular seal is compressed against the pressure plate and the torque converter housing in the sealed position.

Additional optional features may be provided, including but not limited to the following: the annular seal defining a groove within a peripheral surface of the annular seal; the annular seal having a lip extending from the peripheral surface adjacent to the groove; the lip being effective to prevent the flow of hydraulic fluid past the annular seal in the sealed position; the annular seal being in the sealed position and preventing hydraulic fluid from flowing past the annular seal when the piston or pressure plate is in the applied position; the annular seal being in the open position and allowing hydraulic fluid to flow past the annular seal when the piston or pressure plate is in the released position; a leaf spring configured to bias the piston or pressure plate into the released position; the applied position being a fully applied position; wherein the piston or pressure plate is further movable into a partially applied position to partially engage the clutch plate; the annular seal being in the open position when the piston or pressure plate is in the partially applied position; the annular seal being formed of a thermoplastic material; the annular seal defining a plurality of grooves in the peripheral surface of the annular seal; the piston being a pressure plate defining an orifice therethrough; the orifice configured to permit the transfer of a predetermined amount of hydraulic fluid through the pressure plate to facilitate the circulation of hydraulic fluid and thereby cool the clutch plate; wherein the piston or pressure plate is configured to move into the fully applied position when at least a first predetermined amount of hydraulic pressure is applied to an outer side of the piston or pressure plate; the piston or pressure plate being configured to move into the partially applied position when a second predetermined amount of pressure is applied to the outer side of the piston or pressure plate; the pressure plate being configured to compress the leaf spring in the partially applied position and in the fully applied position; and the piston or pressure plate being configured to move into the released position when a third predetermined amount of hydraulic pressure is applied to an inner side of the piston or pressure plate.

Further additional features may be provided, including but not limited to the following: an isolator operatively connected to the torque converter clutch; the isolator being configured to at least partially absorb engine torque spikes; a torque converter pump mounted to the torque converter housing; a turbine disposed within the torque converter housing; a stator disposed between the torque converter pump and the turbine; the pressure plate and the isolator defining an apply cavity; the pressure plate and the torque converter housing defining a release cavity; the pressure plate being moveable into the partially applied position and the fully applied position by transferring hydraulic fluid to the apply cavity; the pressure plate being moveable into the released position by transferring hydraulic fluid to the release cavity; the clutch plate having friction material disposed thereon; the friction material having an opening formed therethrough to allow hydraulic fluid to flow through the opening; the annular seal having a cross-section defined by a peripheral outer surface, a pair of side surfaces, and an inner surface; and the annular seal defining a groove within a side surface of the pair of side surfaces.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure or its application or uses.

Figure 1:
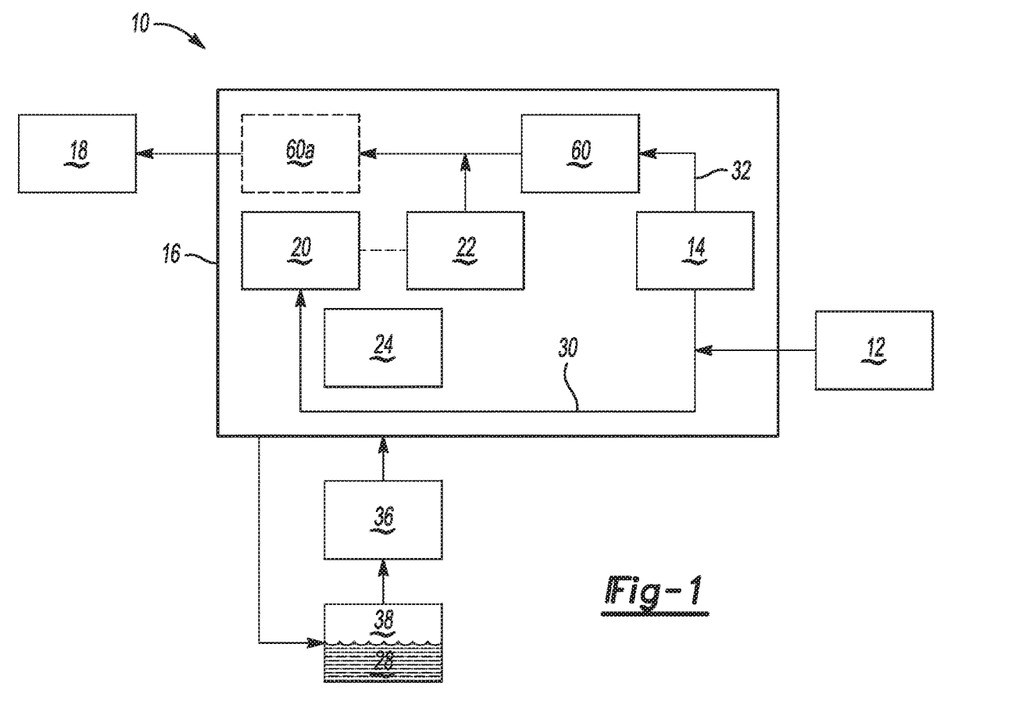
FIG. 1 is a schematic depiction of a vehicle propulsion system having a torque converter, in accordance with the principles of the present disclosure.

Referring to the drawings, wherein like reference numbers refer to like components, FIG. 1 shows a schematic depiction of a vehicle propulsion system 10. The vehicle propulsion system 10 includes an engine 12, a torque converter 16, and a transmission 18. The torque converter 16 includes a torque converter clutch 14, which may be an electronically controlled converter clutch (ECCC), a torque converter pump 20 (a driving member), a turbine 22 (a driven member), and a stator 24. The torque converter 16 further includes a housing member 26 (shown in FIG. 2) attached to the torque converter pump 20 such that a chamber full of hydraulic fluid 28 is formed therebetween.

Figure 2:
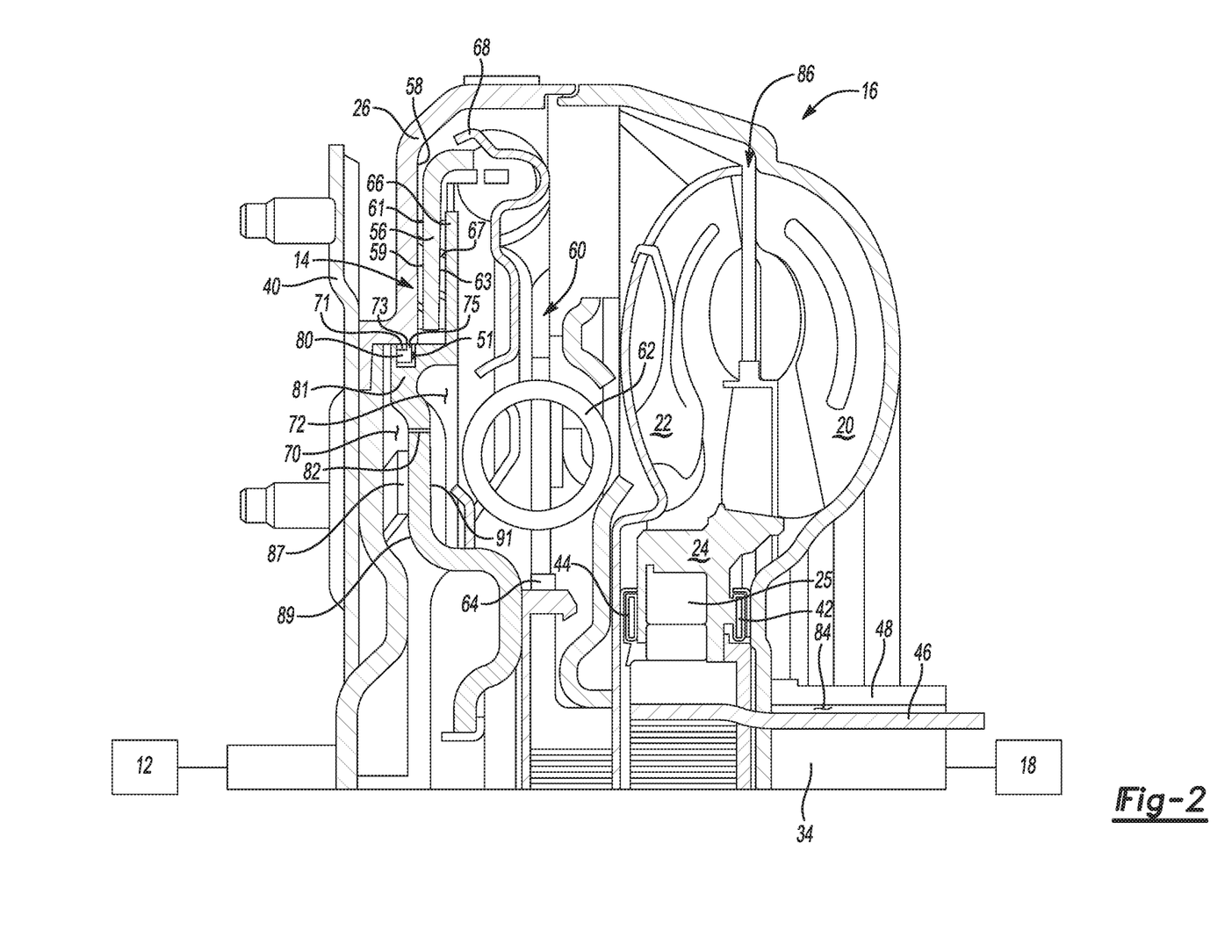
FIG. 2 is a partial sectional view of the torque converter of FIG. 1, according to the principles of the present disclosure.

In the illustrated example, the torque converter 16 includes an isolator 60 positioned as shown in FIGS. 1-2. According to an alternate embodiment, the isolator 60a may be relocated as shown by the dashed line representation thereof in FIG. 1. It should therefore be appreciated that one or the other, but not both, of the isolators 60, 60a are implemented for a given propulsion system 10.

The torque converter clutch 14 has three primary operational modes including "disengaged", "fully engaged", and "partially engaged". "Disengaged" refers to the mode wherein the clutch plate 56 (shown in FIG. 2) moves freely with respect to the case 26 and the piston 66, is generally not in contact with the case 26 and the piston 66, and is therefore free to rotate independently of the case 26 and the piston 66. "Fully engaged" refers to the mode wherein the clutch plate 56 is brought into engagement with the case 26 with an apply force by the piston 66 that is sufficient to prevent relative rotation or "slip" under normal operating conditions. In other words, in the "fully engaged" mode of the clutch 56, the case 26, clutch plate 56, and piston 66 are locked together to prevent relative rotation therebetween. "Partially engaged" refers to the mode wherein the clutch plate 56 is brought into engagement with the case 26 by a reduced apply force of the piston 66, such that clutch plate 56 can slip with respect to the case 26 and/or the piston 66 in a controllable manner.

When the torque converter clutch 14 is disengaged, the engine 12 can transfer torque to the transmission 18 via a first power-flow path 30. Torque transferred via the first power-flow path 30 is passed from the engine 12, through the torque converter housing 26 (shown in FIG. 2), and to the torque converter pump 20. Thereafter, engine torque is transferred from the torque converter pump 20 to the turbine 22 through an operation of the hydraulic fluid 28. The turbine 22 is connected to a turbine shaft 34 (shown in FIG. 2) which drives the transmission 18. In the example shown in FIGS. 1 and 2, when the torque converter clutch 14 is disengaged, the path of engine torque bypasses the isolator 60 via power-flow path 30.

The transfer of engine torque from the torque converter pump 20 to the turbine 22 occurs through operation of the hydraulic fluid 28. More specifically, rotation of the torque converter pump 20 causes the hydraulic fluid 28 to be directed outward toward the turbine vanes (not shown) of the turbine 22. When this occurs with sufficient force to overcome the resistance to rotation, the turbine 22 begins to turn. The fluid flow exiting the turbine 22 is directed back into the torque converter pump 20 by way of the stator 24. The stator 24 redirects the fluid flow from the turbine 22 to the torque converter pump 20 in the same direction as torque converter pump rotation, thereby reducing pump torque and causing torque multiplication.

When the torque converter clutch 14 is completely or fully engaged, the engine 12 can transfer torque to the transmission 18 via a second power-flow path 32. Engagement of the torque converter clutch 14 mechanically couples the torque converter pump 20 and the turbine 22 such that the torque converter pump 20 and turbine 22 rotate together. Therefore, engine torque is transferable to the transmission 18 without any efficiency losses associated with the operation of the hydraulic fluid 28. The second power-flow path 32 also preferably incorporates an isolator 60 configured to at least partially absorb engine torque spikes and thereby provide smoother vehicle operation. In this example, when the torque converter clutch 14 is completely engaged, the path of engine torque is through the isolator 60 and the inertia of the turbine 22 is downstream relative to the isolator 60.

When the torque converter clutch 14 is partially engaged, it can selectively slip in a controllable manner and thereby transfer torque via both the first and second power-flow paths 30, 32. By controlling the degree of torque converter clutch 14 engagement, and correspondingly the amount of slip, the torque converter clutch 14 may be implemented to at least partially absorb engine torque spikes and thereby provide smoother vehicle operation.

The torque converter clutch 14 is preferably hydraulically actuated, and the operational mode of the torque converter clutch 14 is selectable by transferring hydraulic fluid 28 through the torque converter 16 in a predefined manner as will be described in detail hereinafter. Accordingly, a pump 36 is provided to transfer the hydraulic fluid 28 from a sump 38 to the torque converter 16. After being circulated through the torque converter 16, the hydraulic fluid 28 is returned to the sump 38.

Referring now to FIG. 2, the torque converter 16 is shown in more detail. A flexplate 40 is operatively connected to both the engine 12 (shown in FIG. 1) and the torque converter housing 26 such that engine output is transferable therebetween. The torque converter 16 preferably includes first and second thrust bearings 42, 44 configured to rotatably support the stator 24. The stator 24 is connected to a stator shaft 46 by way of a one-way roller clutch 25 which prevents rotation of the stator 24 at lower torque converter 16 speeds. At higher torque converter 16 speeds, the direction of hydraulic fluid 28 leaving the turbine 22 changes, which causes the stator 24 to over-run the one-way clutch 25 and rotate freely on the stator shaft 46. The torque converter pump 20 is secured to the pump hub 48, and the turbine 22 is secured to the turbine shaft 34.

As shown in FIG. 2, the torque converter 16 includes the torque converter clutch 14, which is disposed within the torque converter housing 26. The torque converter clutch 14 includes a single clutch plate 56 (in this example), however, it should be understood that multiple interleaved clutch plates could be used, if desired. The clutch plate 56 is selectively engageable with an inner side 58 of the housing 26. As such, one or both of the clutch plate 56 and the inner side 58 of the housing 26 may having a friction material lining 59 disposed thereon, to assist with maintaining contact between the housing 26 and the clutch plate 56 when the clutch 14 is engaged. The clutch plate 56 may have the friction material disposed on both a first face 61 and a second face 63, if desired, and an additional friction material lining 59 may optionally be disposed on the piston 66 for maintaining contact between the clutch plate 56 and the piston 66, when the clutch 14 is engaged. In the illustrated example, the clutch plate 56 has the friction material lining 59 disposed on its opposed first and second faces 63, but no additional friction material is used on the piston 66 or the case 26.

The clutch plate 56 may be mounted to the radially outer portion 68 of the isolator 60. The isolator 60 includes a plurality of isolator springs 62 configured to at least partially absorb an engine torque spike in order to provide smoother vehicle operation. A radially inner portion 64 of the isolator 60 may be coupled to the turbine shaft 34.

The piston 66, which may also be referred to as a pressure plate, may be configured to selectively bring the clutch plate 56 into engagement with the case 26 to engage the torque converter clutch 14. The piston 66 is moveable between an applied position (wherein the clutch 14 is engaged) and a released position (wherein the clutch 14 is disengaged). In some forms, the piston 66 may be moveable between a released position, a fully applied position (wherein the clutch 14 is fully engaged), and a partially applied position (wherein the clutch 14 is partially engaged, with slippage, as explained above).

A release cavity 70 is defined between the piston 66 and the torque converter housing 26, and an apply cavity 72 is defined between the piston 66 and the isolator 60. When the fluid pressure in the apply cavity 72 exceeds that in the release cavity 70, the piston 66 is translated in a direction toward the engine 12, thereby engaging the torque converter clutch 14 (e.g., engaging the piston 66 with the clutch plate 56 and bringing the clutch plate 56 into engagement with the inner wall 58 of the case 26). When the fluid pressure in the release cavity 70 exceeds that in the apply cavity 72, the piston 66 is translated in a direction toward the transmission 18, thereby disengaging the torque converter clutch 14 (e.g., disengaging the clutch plate 56 from the inner wall 58 of the case 26). In addition, a leaf spring 87 biases the piston 66 into the released position; the spring force must also be overcome to engage the torque converter clutch 14. The piston 66 is configured to compress the leaf spring 87 in the partially applied position and in the fully applied position.

The amount by which the pressure in the apply cavity 72 exceeds the pressure in the release cavity 70 dictates the degree of torque converter clutch 14 engagement. In other words, if the pressure in the apply cavity 72 only slightly exceeds the pressure in the release cavity 70, the torque converter clutch 14 is only partially engaged and may therefore slip. It should therefore be appreciated that by controlling the pressure levels in the cavities 70, 72, the torque converter clutch 14 can correspondingly be controlled to disengage, completely engage, or partially engage and slip in a controllable manner.

In some examples, to release the torque converter clutch 14, the pump 36 (shown in FIG. 1) is operated to transfer hydraulic fluid 28 (shown in FIG. 1) into the release cavity 70 to apply fluid pressure to an outer side 89 of the piston 66. However, the leaf spring 87 also biases the piston 66 in the released position. Applying a predetermined amount of hydraulic fluid pressure into the release cavity 70 and against the outer side 89 of the piston 66 translates the piston 66 away from the clutch plates 56 and the torque converter clutch 14 remains or becomes disengaged.

To either partially or fully (completely) engage the torque converter clutch 14, the pump 36 (shown in FIG. 1) is operated to transfer hydraulic fluid 28 through the torque converter 16, which may come through a release passage 84 defined between the pump hub 48 and the stator shaft 46. Thereafter, the hydraulic fluid 28 may pass via a first flow path through the thrust bearing 42 and across the blades (not shown) of the torque converter pump 20, and via a second flow path through the thrust bearing 44 and across the blades (not shown) of the turbine 22. The hydraulic fluid 28 exits a gap 86 defined between the turbine 22 and the torque converter housing 26, and passes by the isolator 60 to apply pressure to an inner side 91 of the piston 66, in the apply cavity 72.

This transfer of hydraulic fluid 28 into the apply cavity 72 generates pressure therein such that the piston 66 is translated toward the clutch plate 56. The translation of the piston 66 applies a force tending to bring the clutch plate 56 into contact with the inner wall 58 of the case 26 such that the torque converter clutch 14 is engaged. The magnitude of the force applied by the piston 66 is proportional to the pressure level in the apply cavity 72. Therefore, the degree of torque converter clutch 14 engagement is selectable by controlling the output of the pump 36 as it transfers hydraulic fluid 28 into the apply cavity 72. Thus, the pressure plate or piston 66 is moveable into the partially applied position and the fully applied position by transferring hydraulic fluid to the apply cavity 72. If one predetermined amount of hydraulic pressure is applied to the inner side 91 of the piston 66, the piston 66 may be partially applied, and if another greater amount of hydraulic pressure is applied to the inner side 91 of the piston 66, the piston 66 may be fully applied.

Referring now to FIGS. 2, 3A-3B, and 4, an annular seal 80 is disposed adjacent to the piston 66. In this example, the annular seal 80 is disposed circumferentially about a lip portion 81 of the piston 66, within a crevice 51 formed in the piston 66. The annular seal 80 is configured to permit the transfer of hydraulic fluid 28 (shown in FIG. 1) from the release cavity 70 to the clutch plate 56 and the apply cavity 72 in an open position, and to seal the release cavity 70 in a sealed position. While a single annular seal 80 is shown, it should be appreciated that multiple annular seals may alternatively be implemented.

Figure 3A:
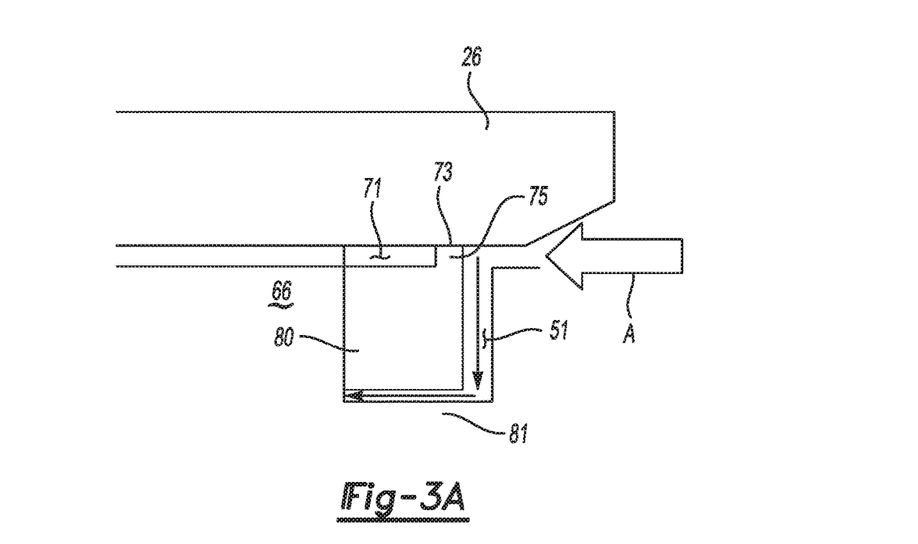
FIG. 3A is a close-up schematic of a portion of a case, piston, and seal of the torque converter of FIGS. 1-2, with the seal in a sealed position, in accordance with the principles of the present disclosure.
Figure 3B:
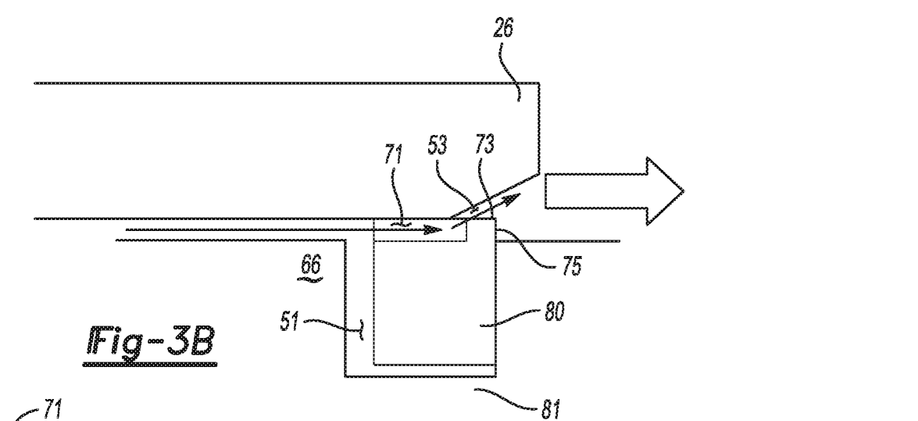
FIG. 3B is a close-up schematic of a portion of a case, piston, and seal of the torque converter of FIGS. 1-2, with the seal in an open position, according to the principles of the present disclosure.
Figures 4, 5:
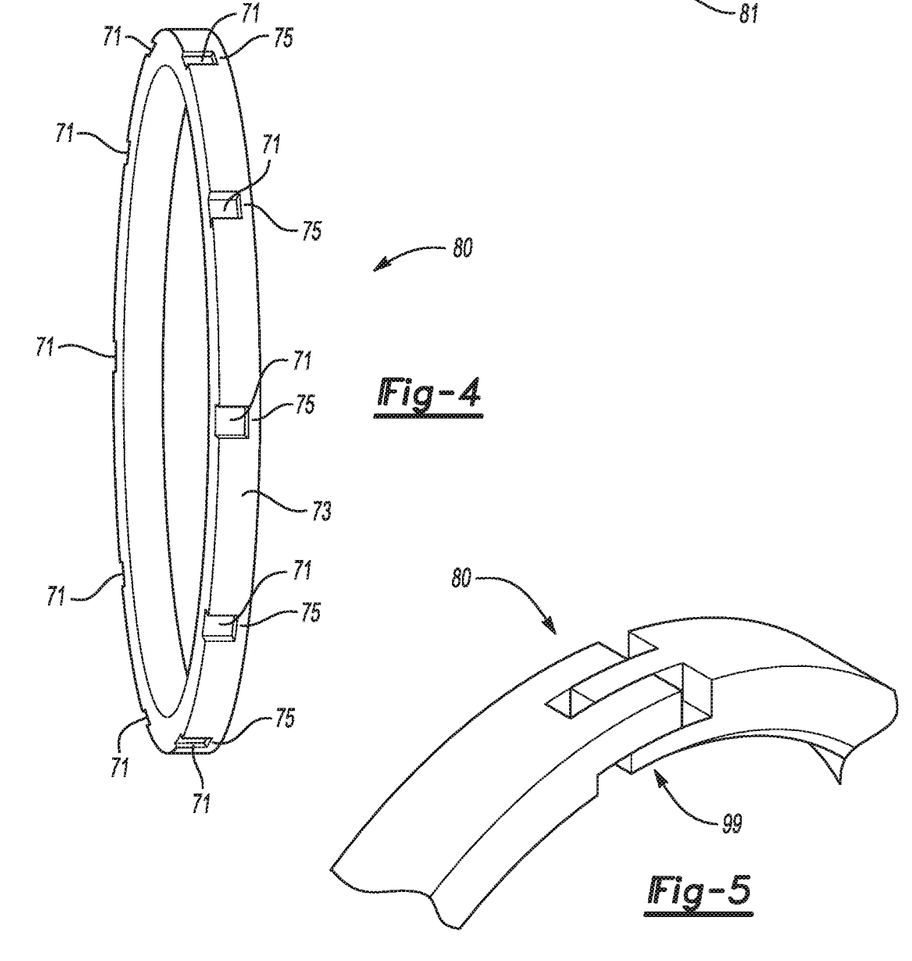
FIG. 4 is a perspective view of the seal shown in FIGS. 2-3B, in accordance with the principles of the present disclosure.
FIG. 5 is a perspective view of a joint in a portion of the seal of FIGS. 2-4, according to the principles of the present disclosure.

As shown in FIGS. 3A-3B and 4, the annular seal 80 may define one or more grooves 71 within a peripheral outer surface 73 of the annular seal 80. The grooves 71 are axially disposed along the peripheral outer surface 73, as the grooves 71 run parallel to a central axis of the torque converter 16 and a central axis of the annular seal 80. A lip 75 may be disposed adjacent to each of the grooves 71. The annular seal 80 may be formed of any suitable material for sealing, such as a thermoplastic or a thermoset material. Examples of thermoplastics that may be used include polyamide-imide, such as that sold under the trademark Torlon®, and polyether ether ketone (PEEK).

Referring now to FIG. 5, the annular seal 80 may have one or more joints 99, such as prongs, to aid with assembly of the annular seal 80. FIG. 5 represents a T-joint. In the alternative, any other solid or split seal, or a continuous annular seal 80 with no joint, could be used. Some other joints that could be used in place of the joint 99 could include a double step joint, an angled joint, or a conventional lap joint, by way of example.

Movement of the piston 66 and hydraulic pressure causes the annular seal 80 to move between a sealed position and an open position. More particularly, referring to FIG. 3A, when hydraulic pressure fills the apply cavity 72 and exerts pressure on the inner side 91 of the piston 66, fluid pressure is applied in the direction shown by the arrow A in FIG. 3A, which applies the piston 66 and pushes the seal 80 to a leftmost position within the crevice 51 of the piston 66. The seal 80 is then in the sealed position and seals between the case 26 and the piston 66, sealing off the release cavity 70.

Referring now to FIG. 3B, when fluid pressure is reversed and applied in the release cavity 70 to move the piston 66 toward the released position, the seal 80 moves to the open position, which is the seal's 80 rightmost position with the crevice 51. In the open position, a leak passage 53 is formed between the seal 80 and the case 26 to allow fluid to flow from the release passage 70 toward the clutch plate 56. Thus, the annular seal 80 is in the sealed position, preventing hydraulic fluid from flowing past the annular seal 80, when the piston 66 is in the applied position, and the annular seal 80 is in the open position, allowing hydraulic fluid to flow past the annular seal 80, when the piston 66 is in the released position.

The seal 80 can be sized as appropriate to also be in the open position when the clutch 14 is partially engaged. Thus, the seal 80 may be in the open position when the piston 66 is partially applied and when the piston 66 is fully applied, if desired.

The piston 66 may also define one or more orifices 82. In one example, the orifice 82 is configured to allow the transfer of approximately 1.89 L/min, or 0.5 gallons per minute (gpm), of hydraulic fluid 28 between the cavities 70 and 72, or the orifice 82 could be sized as desired to provide for a desired transfer rate of fluid therethrough. In some examples, the orifice 82 is sized to allow 1-3 L/min to flow therethrough. The orifice 82 allows for the circulation of a predetermined amount of hydraulic fluid 28 throughout the torque converter 16 in order to prevent heat buildup.

In the sealed position, the annular seal 80 closes to block the transfer of hydraulic fluid 28 (shown in FIG. 1) from the first cavity 70 to the second cavity 72. Therefore, when the annular seal 80 is in the sealed position, the only transfer of hydraulic fluid 28 from the first cavity 70 to the second cavity 72 takes place through the orifice 82, and the rate of such transfer is dictated by the size of the orifice 82.

Figure 6A:
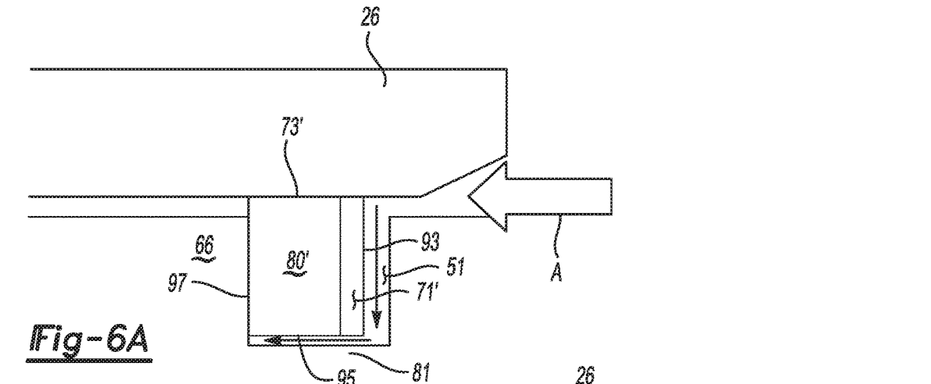
FIG. 6A is a close-up schematic of a portion of a case, piston, and an alternative seal for use in the torque converter of FIGS. 1-2, with the alternative seal in a sealed position, in accordance with the principles of the present disclosure.
Figure 6B:
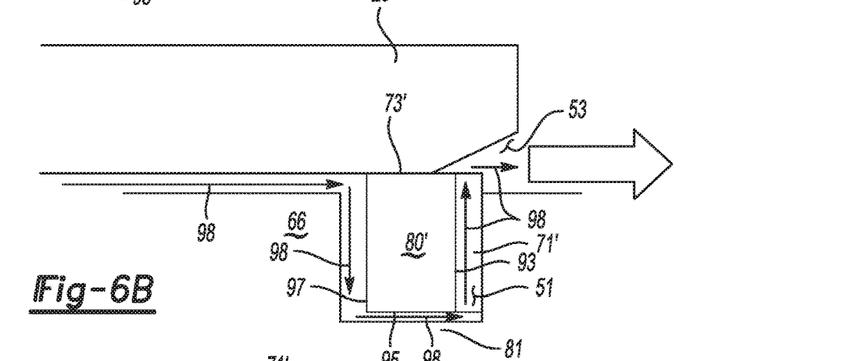
FIG. 6B is a close-up schematic of a portion of a case, piston, and the alternative seal of FIG. 6A, with the alternative seal in an open position, according to the principles of the present disclosure.
Figure 7:
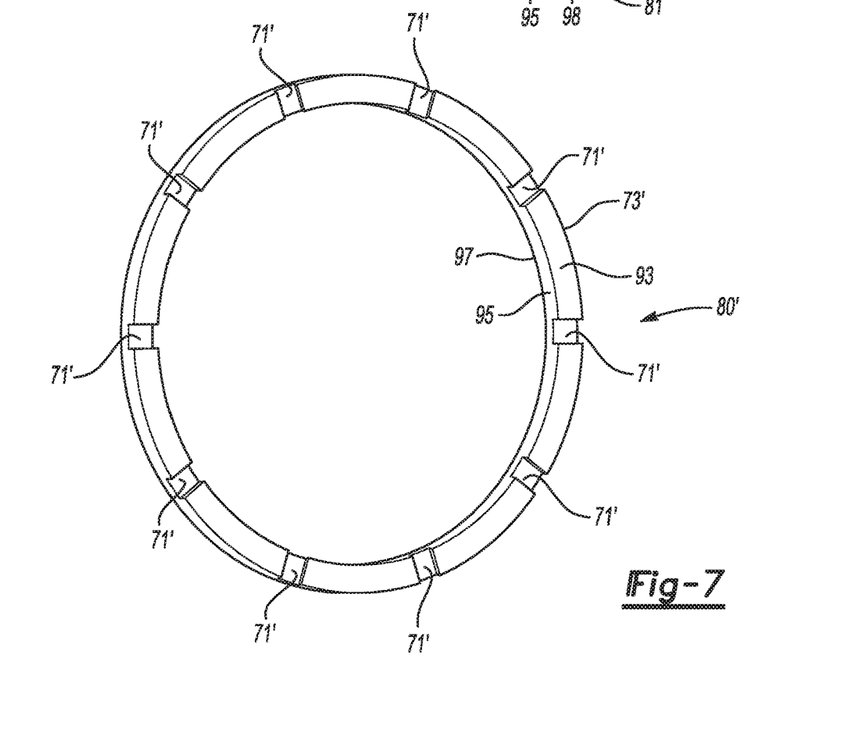
FIG. 7 is a perspective view of the alternative seal shown in FIGS. 6A-6B, in accordance with the principles of the present disclosure.

Referring now to FIGS. 6A-6B and 7, an alternative version of the annular seal is illustrated and designated at 80'. It should be understood that the alternative annular seal 80' can be used in place of the seal 80 shown in FIG. 2. In FIGS. 6A-6B, the seal 80' is disposed adjacent to the piston 66. As before, the seal 80' is disposed circumferentially about a lip portion 81 of the piston 66, within a crevice 51 formed in the piston 66. Like the seal 80 described above, the seal 80' is configured to permit the transfer of hydraulic fluid 28 (shown in FIG. 1) from the release cavity 70 to the clutch plate 56 and the apply cavity 72 in an open position, and to seal the release cavity 70 in a sealed position. While a single annular seal 80' is shown, it should be appreciated that multiple annular seals may alternatively be implemented.

In the example of FIGS. 6A-6B and 7, the annular seal 80' defines one or more grooves 71' within a side surface 93 of the annular seal 80'. More particularly, the cross-section of the annular seal 80' is defined by an outer surface 73', an inner surface 95, and a pair of side surfaces 93, 97 connecting the outer and inner surfaces 73', 95. The grooves 71' are defined radially within the side surface 93, as the grooves 71' run along a radius of the seal 80'.

Like the seal 80 described above, the seal 80' may be formed of any suitable material for sealing, such as a thermoplastic or a thermoset material. The annular seal 80' may have one or more joints 99, such as prongs (see FIG. 5), to aid with assembly of the annular seal 80'.

Movement of the piston 66 and hydraulic pressure causes the annular seal 80' to move between a sealed position and an open position. More particularly, referring to FIG. 6A, when hydraulic pressure fills the apply cavity 72 and exerts pressure on the inner side 91 of the piston 66, fluid pressure is applied in the direction shown by the arrow A in FIG. 6A, which applies the piston 66 and pushes the seal 80' to a leftmost position within the crevice 51 of the piston 66. The seal 80' is then in the sealed position and seals between the case 26 and the piston 66, sealing off the release cavity 70.

Referring now to FIG. 6B, when fluid pressure is reversed and applied in the release cavity 70 to move the piston 66 toward the released position, the seal 80' moves to the open position, which is the seal's 80' rightmost position with the crevice 51. In the open position, a leak passage 53 is formed between the seal 80' and the case 26 to allow fluid to flow from the release passage 70 toward the clutch plate 56. More particularly, fluid flows around the seal 80' and through the grooves 71', as shown by arrows 98 and through the leak passage 53.

Thus, the annular seal 80' is in the sealed position, preventing hydraulic fluid from flowing past the annular seal 80', when the piston 66 is in the applied position, and the annular seal 80' is in the open position, allowing hydraulic fluid to flow past the annular seal 80, when the piston 66 is in the released position and/or in the partially applied position.

The annular seal 80, 80' is a dedicated seal disposed between the piston 66 and the cover 26. When the piston 66 is applied and the clutch 14 is engaged, the seal 80, 80' activates quickly because the clutch plate 56 does not need to serve as a seal for the release cavity 70. Since the friction material lining 59 does not need to act as a seal, openings 67 may be cut through the friction material linings 59 to allow for better cooling of the clutch assembly 14. The piston 66 with the seal 80, 80' allows for different oil flow rates depending on whether the piston 66 is applied, or depending on the direction of the sealing pressure. For example, the orifice 82 allows a certain amount of cooling fluid to flow through the piston 66 when the piston 66 is being applied (for example, about 1-3 L/min may flow through the orifice 82 when the piston 66 is applied, depending on the size of the orifice 82, as explained above). When the piston 66 is released, a greater amount of fluid flows past the piston 66, through both the orifice 82 and past the seal 80, 80' through the leak path 53. For example, in some cases, 6-8 L/min of fluid flows past the piston 66 when the piston 66 is disengaged. An additional dedicated hydraulic line is not required to control the piston 66, thereby providing a simplified and more compact design with fewer components.

The description is merely exemplary in nature and variations are intended to be within the scope of this disclosure. The examples shown herein can be combined in various ways, without falling beyond the spirit and scope of the present disclosure. Such variations are not to be regarded as a departure from the spirit and scope of the present disclosure.

What is claimed is:

1. A clutch assembly for an automotive transmission, the clutch assembly comprising:
   a clutch plate;
   a piston configured to selectively engage the clutch plate, the piston being movable between an applied position and a released position;
   an annular seal disposed adjacent to the piston, wherein movement of the piston and hydraulic pressure causes the annular seal to move between a sealed position and an open position; and
   a leaf spring, wherein the piston is configured to move into the fully applied position when at least a first predetermined amount of hydraulic pressure is applied to a first side of the piston, the piston being configured to move into the partially applied position when at least a second predetermined amount of hydraulic pressure is applied to the first side of the piston, the piston being configured to compress the leaf spring in the partially applied position and in the fully applied position, and the piston being configured to move into the released position when a third predetermined amount of hydraulic pressure is applied to a second side of the piston.

2. The clutch assembly of claim 1, the annular seal being in the sealed position and preventing hydraulic fluid from flowing past the annular seal when the piston is in the applied position, and the annular seal being in the open position and allowing hydraulic fluid to flow past the annular seal when the piston is in the released position.

3. The clutch assembly of claim 2, the annular seal defining a groove within a peripheral outer surface of the annular seal.

4. The clutch assembly of claim 3, the annular seal having a lip extending from the peripheral outer surface adjacent to the groove.

5. The clutch assembly of claim 4, the applied position being a fully applied position, wherein the piston is further movable into a partially applied position to partially engage the clutch plate, the annular seal being in the open position when the piston is in the partially applied position.

6. The clutch assembly of claim 5, the groove being a first groove, the annular seal being formed of a thermoplastic material, the annular seal defining a plurality of additional grooves in the peripheral outer surface of the annular seal.

7. The clutch assembly of claim 6, the piston being a pressure plate defining an orifice therethrough, the orifice configured to permit the transfer of a predetermined amount of hydraulic fluid through the pressure plate to facilitate the circulation of hydraulic fluid and thereby cool the clutch plate.

8. The clutch assembly of claim 1, the annular seal having a cross-section defined by a peripheral outer surface, a pair of side surfaces, and an inner surface, the annular seal defining a groove within a side surface of the pair of side surfaces.

9. A clutch assembly for an automotive transmission, the clutch assembly comprising:
   a clutch plate;
   a piston configured to selectively engage the clutch plate, the piston being movable between an applied position and a released position, the piston being a pressure plate defining an orifice therethrough, the orifice configured to permit the transfer of a predetermined amount of hydraulic fluid through the pressure plate to facilitate the circulation of hydraulic fluid and thereby cool the clutch plate;
   an annular seal disposed adjacent to the piston, wherein movement of the piston and hydraulic pressure causes the annular seal to move between a sealed position and an open position, the annular seal being in the sealed position and preventing hydraulic fluid from flowing past the annular seal when the piston is in the applied position, and the annular seal being in the open position and allowing hydraulic fluid to flow past the annular seal when the piston is in the released position, the annular seal defining a plurality of grooves within a peripheral outer surface of the annular seal, the annular seal having a lip extending from the peripheral outer surface adjacent to each groove, the applied position being a fully applied position, wherein the piston is further movable into a partially applied position to partially engage the clutch plate, the annular seal being in the open position when the piston is in the partially applied position, the annular seal being formed of a thermoplastic material; and a leaf spring, wherein the pressure plate is configured to move into the fully applied position when at least a first predetermined amount of hydraulic pressure is applied to a first side of the pressure plate, the pressure plate being configured to move into the partially applied position when at least a second predetermined amount of hydraulic pressure is applied to the first side of the pressure plate, the pressure plate being configured to compress the leaf spring in the partially applied position and in the fully applied position, and the pressure plate being configured to move into the released position when a third predetermined amount of hydraulic pressure is applied to a second side of the pressure plate.

10. A torque converter assembly for an automatic transmission, the torque converter assembly comprising:

a torque converter housing;

a torque converter clutch disposed within the torque converter housing, wherein the torque converter clutch includes:

a clutch plate;

a pressure plate, being configured to selectively engage the clutch plate, the pressure plate being movable between an applied position and a released position;

an annular seal disposed adjacent to the pressure plate and the torque converter housing, wherein movement of the pressure plate and hydraulic pressure causes the annular seal to move between a sealed position and an open position, wherein the annular seal is compressed against the pressure plate and the torque converter housing in the sealed position; and a leaf spring, wherein the pressure plate is configured to move into the fully applied position when at least a first predetermined amount of hydraulic pressure is applied to a first side of the pressure plate, the pressure plate being configured to move into the partially applied position when at least a second predetermined amount of hydraulic pressure is applied to the first side of the pressure plate, the pressure plate being configured to compress the leaf spring in the partially applied position and in the fully applied position, the pressure plate being configured to move into the released position when at least a third predetermined amount of hydraulic pressure is applied to a second side of the pressure plate.

11. The torque converter assembly of claim 10, the annular seal being in the sealed position and preventing hydraulic fluid from flowing past the annular seal when the pressure plate is in the applied position, and the annular seal being in the open position and allowing hydraulic fluid to flow past the annular seal when the pressure plate is in the released position.

12. The torque converter assembly of claim 11, the annular seal defining a groove within a peripheral outer surface of the annular seal.

13. The torque converter assembly of claim 12, the annular seal having a lip extending from the peripheral outer surface adjacent to the groove, the lip being effective to prevent the flow of hydraulic fluid past the annular seal in the sealed position.

14. The torque converter assembly of claim 13, the applied position being a fully applied position, wherein the pressure plate is further movable into a partially applied position to partially engage the clutch plate, the annular seal being in the open position when the pressure plate is in the partially applied position.

15. The torque converter assembly of claim 14, the clutch plate having friction material disposed thereon, the friction material having an opening formed therethrough to allow hydraulic fluid to flow through the opening.

16. The torque converter assembly of claim 15, the pressure plate defining an orifice therethrough, the orifice configured to permit the transfer of a predetermined amount of hydraulic fluid through the pressure plate to facilitate the circulation of hydraulic fluid and thereby cool the clutch plate.

17. The torque converter assembly of claim 16, further comprising:

an isolator operatively connected to the torque converter clutch, the isolator being configured to at least partially absorb engine torque spikes, the pressure plate and the isolator defining an apply cavity, the pressure plate and the torque converter housing defining a release cavity;

a torque converter pump mounted to the torque converter housing;

a turbine disposed within the torque converter housing; and a stator disposed between the torque converter pump and the turbine, the pressure plate being moveable into the partially applied position and the fully applied position by transferring hydraulic fluid to the apply cavity.

18. The torque converter housing assembly of claim 10, the annular seal having a cross-section defined by a peripheral outer surface, a pair of side surfaces, and an inner surface, the annular seal defining a groove within a side surface of the pair of side surfaces.

* * * * *